United States Patent [19]

Stegall, Sr. et al.

[11] Patent Number: 5,441,631

[45] Date of Patent: * Aug. 15, 1995

[54] WASTE TREATMENT SYSTEM

[76] Inventors: William A. Stegall, Sr., P.O. Box 96, Denham Springs, La. 70726; Marty Tittlebaum, 857 High Plains Ave., Baton Rouge, La. 70810

[*] Notice: The portion of the term of this patent subsequent to Dec. 14, 2010 has been disclaimed.

[21] Appl. No.: 167,529

[22] Filed: Dec. 14, 1993

Related U.S. Application Data

[63] Continuation-in-part of Ser. No. 874,057, Apr. 24, 1992, Pat. No. 5,269,911.

[51] Int. Cl.⁶ .................................... B01D 29/68
[52] U.S. Cl. .................... 210/108; 210/109; 210/195.1; 210/257.1; 210/258
[58] Field of Search ............... 210/86, 97, 104, 108, 210/109, 194, 195.1, 202, 220, 258, 259, 411, 416.1, 521, 532.1, 532.2, 136, 179, 791, 136

[56] References Cited

U.S. PATENT DOCUMENTS

| | | | |
|---|---|---|---|
| 2,938,630 | 5/1960 | Novak | 210/114 |
| 2,987,186 | 6/1961 | Burgoon et al. | 210/197 |
| 3,051,315 | 8/1962 | Boester | 210/195 |
| 3,195,727 | 7/1965 | Kibbee | 210/195 |
| 3,724,664 | 4/1973 | Lemberger et al. | 210/104 |
| 3,764,011 | 10/1973 | Owens | 210/195 |
| 3,878,101 | 4/1975 | Kennedy | 210/202 |
| 3,907,672 | 9/1975 | Milne | 210/605 |
| 3,950,252 | 4/1976 | Jordan et al. | 210/281 |
| 4,021,347 | 5/1977 | Teller et al. | 210/195 |
| 4,070,292 | 1/1978 | Adams | 210/195.1 |
| 4,100,073 | 7/1978 | Hopcroft | 210/532 |
| 4,139,471 | 2/1979 | Foti | 210/170 |
| 4,211,654 | 7/1980 | Weber et al. | 210/104 |
| 4,211,655 | 7/1980 | Jordan | 210/108 |
| 4,505,813 | 3/1985 | Graves | 210/86 |
| 4,664,795 | 5/1987 | Stegall et al. | 210/202 |
| 4,681,684 | 7/1987 | Maroschak et al. | 210/532.2 |
| 4,834,879 | 5/1989 | Stegall et al. | 210/205 |
| 4,986,905 | 1/1991 | White | 210/104 |
| 5,100,540 | 3/1992 | Ramirez et al. | 210/258 |
| 5,106,493 | 4/1992 | McIntosh | 210/108 |
| 5,200,065 | 4/1993 | Sinclair et al. | 210/258 |
| 5,269,911 | 12/1993 | Stegall et al. | 210/108 |

*Primary Examiner*—Joseph W. Drodge
*Attorney, Agent, or Firm*—Pravel, Hewitt, Kimball & Krieger

[57] ABSTRACT

A wastewater treatment system uses a primary treatment vessel and a secondary vessel with a filtration unit therebetween. Continuous backwashing of the filtration unit occurs when a well pump is activated to empty the secondary vessel. A portion of fluid discharged by the well pump backwashes the filter continuously as the secondary treatment vessel is emptied.

10 Claims, 8 Drawing Sheets

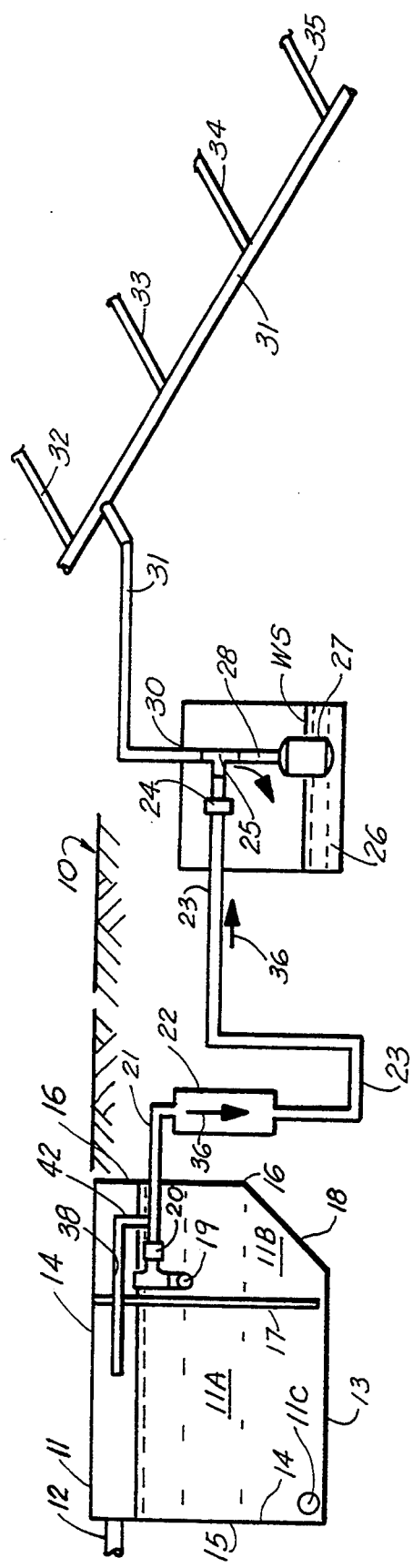
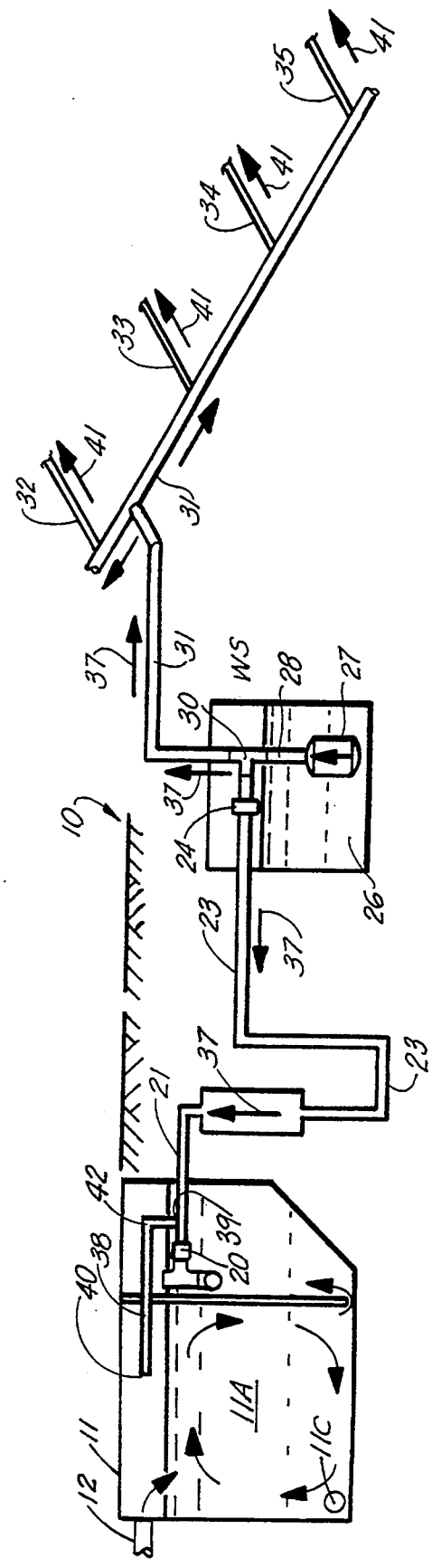
FIG. 1.
FIG. 2.

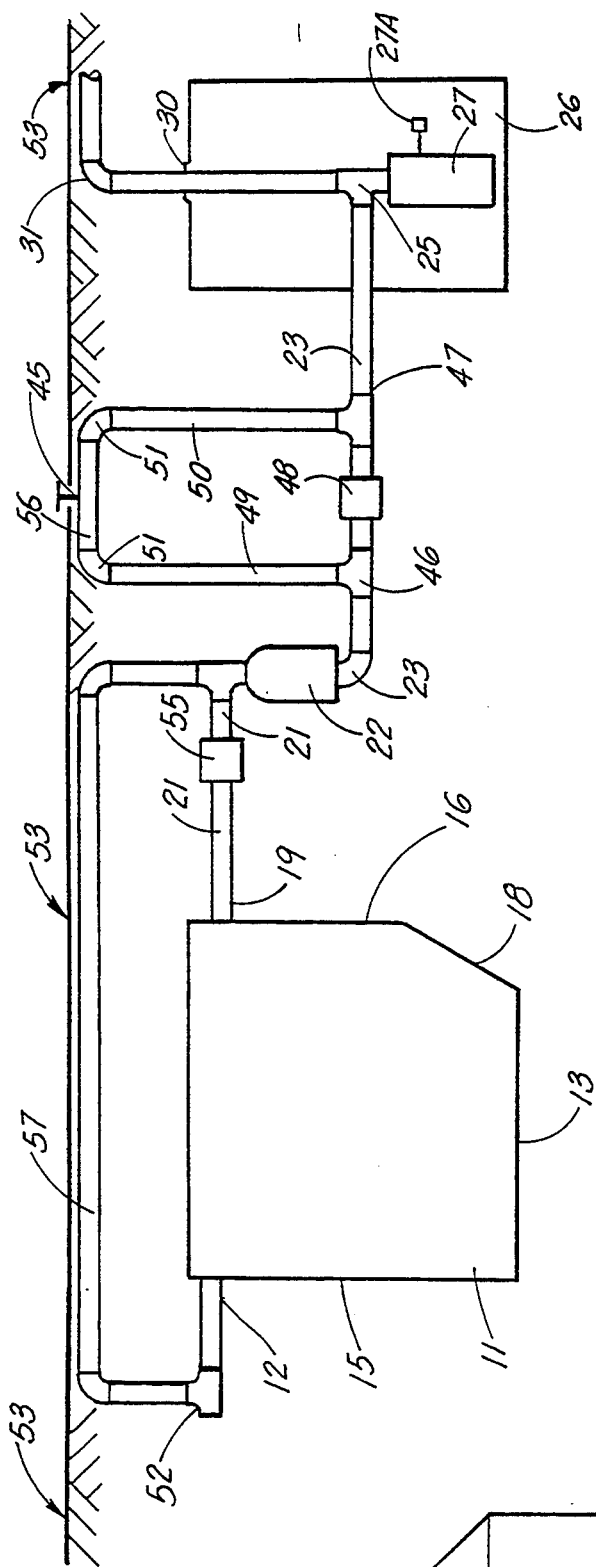
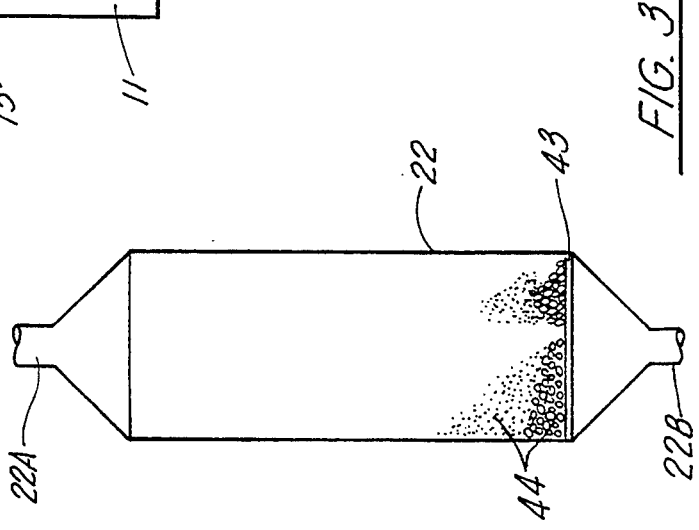
FIG. 4
FIG. 3

WASTE TREATMENT SYSTEM

This is a continuation-in-part application of prior, U.S. patent application Ser. No. 07/874,057, filed Apr. 24, 1992, now U.S. Pat. No. 5,269,911 issued Dec. 14, 1993 and incorporated herein by reference.

BACKGROUND OF THE INVENTION

1. Field of the Invention

The present invention relates to self-contained waste treatment systems and more particularly relates to an improved self-contained wastewater treatment for use in rural areas and in the treatment of wastewater from small buildings, homes, trailer parks, office buildings and the like wherein a primary treatment vessel treats the wastewater product and the effluent passes through a filtration unit into a dosing vessel that cycles between empty and full conditions, with a pump in the dosing tank being activated when the dosing vessel reaches full position, and wherein a flow control device divides discharging flow from the pump into a first larger volume that is discharged to the environment, and a smaller flow portion that backwashes the filter, returning dirty backwash to the primary vessel.

2. General Background

It is desirable that wastewater be treated in an economical way utilizing as little energy as possible and as few moving parts as possible while removing a high percentage of solid material from the wastewater stream and while lowering the total suspended solids and bio-chemical oxygen demand of the wastewater stream. It is desirable that a minimum of sludge removal would be required since sludge disposal presents an extra problem.

It would be desirable that a wastewater treatment apparatus produce a total homogenation of the fluids received from the waste stream in order that they be properly biodegraded. Wastewater entering the unit would normally be heterogeneous in nature, containing solid waste material as well as liquid wastewater.

In aerated treatment systems, a problem is faced in that a clogging of the aeration assembly which provides oxygen and mixing to the unit will cause a degeneration of the treatment process or in fact a total stoppage of air flow to the vessel, transferring the process from aerobic to anaerobic, thus removing most treatment capability. It would be desirable that the aeration unit or air diffuser be provided that minimizes or prevents clogging by solid material which may enter the unit.

In a small wastewater treatment system for use in treatment of wastewater from single family dwellings, small businesses, apartments and the like, tertiary treatment is desirable so that underground disposal of effluent can be used such as under crops to eliminate or minimize environmentally adverse effects.

Also, particularly desirable is a system that would allow treated wastewater to be filtered, prior to environmental discharge, to remove any untreated solids. Inherent in filtration treatment is the problem of filter clogging and the possibility of excessive filter maintenance. Hence, particularly desirable is a system in which the filter may be automatically and routinely backwashed to eliminate problems of filter clogging and excessive maintenance.

SUMMARY OF THE PRESENT INVENTION

The present invention provides an individual home type sewerage treatment system that affords an economical alternative for use in treating domestic wastewater on a day-to-day basis. The apparatus includes a primary treatment vessel wherein waste is biodegraded. The primary treatment vessel may include a non-aerated chamber or in the alternate, an extended aeration chamber with an activated sludge system which is capable of producing a clear, odorless effluent which meets applicable state and federal discharge standards (USEPA). An effluent filtration unit and subsurface disposal system are included in the treatment system to treat the effluent from the primary treatment chamber.

Of particular utility is an automatically self-back-flushing filtration unit. The self-back-flushing filtration unit both automatically filters the treated wastewater prior to environmental discharge, and automatically backflushes the filter preventing filter clogging and extensive maintenance. Both the treatment system and the filtration unit are ideally suited for upgrading existing septic tank systems, in which case the septic tank continues to function as an anaerobic solids tank from which the effluent is discharged into the either primary treatment vessel or the filtration unit. The subsurface disposal system is capable of disposing of the high-quality, treated effluent into almost any soil condition or site topography.

The automatic backwash filtering system of the present invention is designed to provide tertiary treatment for treated wastewater prior to environmental discharge. In the filtration system, effluent from the treatment vessel gravity flows through a flap check valve to the top of a sand filter. The treated wastewater then passes through the filtering media and a support plate by gravity flow. The filtered effluent flows through a second flap check valve and into a dosing chamber. The dosing chamber contains a well-type pump that can be activated by an electric, mercury control float switch. When the float switch activates the pump, a predetermined amount of filtered effluent is pumped from the dosing chamber. When the pressurized effluent leaves the dosing chamber it travels in two directions. The majority of the flow (for example 75%) is delivered to subsurface dripper lines for disposal. The remainder of the flow (for example 25%) is utilized to automatically backwash the sand filter.

The proportion of the flow used for backwashing is directed into a backwash line and through a manually controllable flow valve which is used to limit the amount of treated water being used for backwashing. This valve is desirably adjustable so that a preselected flow value can be used for backwashing the filter. The pressurized backwash water then flows upwardly through the media support plate and filtering media slightly expanding the sand bed and effectively cleaning any captured solids from the filter.

The backwash water and debris then exit the top of the filter and into a backwash line. The dirty water is then returned to the treatment vessel, to be retreated. When the dosing well pump shuts off, backwashing stops and gravity flow through the filter resumes automatically.

The present invention provides an improved wastewater treatment system that includes a first treatment vessel having an interior area for containing a wastewater to be treated. The interior is either a single, non-aerated chamber, or in the alternate, is divided into upstream and downstream portions with a transverse baffle plate. The vessel includes an influent line for adding a wastewater stream to be treated to the interior area. The interior is/or is not aerated and an effluent line discharges clarified liquid from the vessel interior.

A filter (preferably a sand filter) is disposed downstream of the first treatment vessel for filtering clarified liquid that is discharged from the first treatment vessel.

A dosing vessel with an interior area contains liquid that has been filtered with the sand filter, the second vessel being positioned downstream of the filter and including a pump for emptying the second vessel when it is filled with filtered liquid.

A discharge flowline receives effluent from the second vessel and a drip header system can receive flow therefrom, comprising a network of flowlines for distributing the filtered liquid over an expansive area such as a parcel of land.

A flow control device enables a partial volume of liquid exiting the dosing vessel to be transmitted to the filter in reverse flow direction for backwashing the filter. A backwash flowline positioned between the first treatment vessel and the filter recirculates dirty backwash from the filter to the first vessel.

BRIEF DESCRIPTION OF THE DRAWINGS

For a further understanding of the nature and objects of the present invention, reference should be had to the following detailed description taken in conjunction with the accompanying drawings, in which like parts are given like reference numerals, and wherein:

FIG. 1 is a sectional, elevation, and schematic view of the preferred embodiment of the apparatus of the present invention illustrating in the aerated treatment vessel in the normal operating position prior to backwashing;

FIG. 2 is a sectional, elevation, and schematic view of the preferred embodiment of the apparatus of the present invention illustrating the aerated treatment vessel with a backwashing flow and treated effluent discharge configuration;

FIG. 3 is a sectional, elevational and fragmentary view of the sand filter portion of the preferred embodiment of the apparatus of the present invention;

FIG. 4 is a sectional, elevation, and schematic view of the preferred embodiment of the apparatus of the present invention illustrating the aerated treatment vessel with an alternate backwash flow volume control valve arrangement;

DETAILED DESCRIPTION OF THE PREFERRED EMBODIMENT

Figure 5:
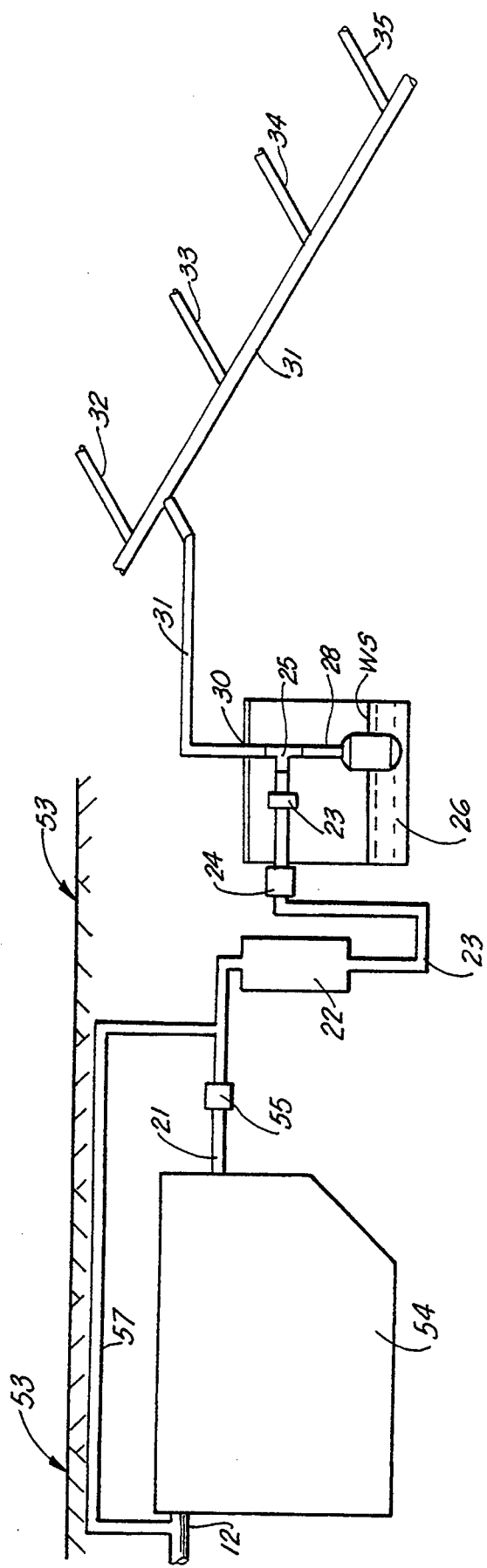
FIG. 5 is a sectional, elevation, and schematic view of the preferred embodiment of the apparatus of the present invention illustrating an alternate non-aerating chamber.

FIG. 1 illustrates the preferred embodiment of the apparatus of the present invention shown with aerated treatment vessel 11 in a normal flow situation. FIG. 1 further illustrates the preferred embodiment of the present invention where aerating treatment vessel 11 has an influent flowline 12 for receiving waste flow into the aerating treatment vessel 11. Aerating treatment vessel 11 includes a bottom wall 13, top wall 14, front wall 15 and rear wall 16. A top can seal the vessel 11 so that vessel 11 can be installed underground.

Vertical baffle 17 divides the aerating treatment vessel 11 into first and second interior portions 11A, 11B. Inclined wall 18 extends between rear wall 16 and bottom wall 13 as shown in FIG. 1. An aerator 11C aerates fluid contained in the portion 11A of the aerating treatment vessel 11.

An effluent header 19 includes multiple turns for existing flow and before the exiting flow enters effluent line 21, passing through first check valve 20. It should be understood that the aerating treatment vessel 11, effluent header 19, and baffle 17 are all shown in prior U.S. Pat. Nos. 4,664,795 issued May 12, 1987 and 4,834,879 issued May 30, 1989, each of which is incorporated herein by reference.

Effluent line 21 transmits treated fluid leaving the aerating treatment vessel 11 to filter 22 via filter inlet 22A. The filter 22 further cleanses flow that has been treated by the aerating treatment vessel 11, removing small particulate matter from the wastewater stream being treated. Filter 22 is preferably a media type filter such as a sand filter. The sand filter (FIG. 3) has a transversely positioned media support plate 43 positioned at the lower end portion of filter 22, just above outlet 22B. On the top of the support plate is a coarse media such as gravel, two to three inches thick. On top of the gravel is a coarse grain sand such as size 610. This designation indicates that 90% of the sand falls between U.S. standard sieve size 6 and 10 (3.35 millimeters and 2.0 millimeters). The plate 43 is perforated using for example a plurality of one eighth inch diameter holes drilled therethrough for the passage of liquid from the filter 22 via outlet 22B and into flowline 23.

After traveling through filter 22 in the direction shown by arrow 36, flow enters effluent line 23 for filtered effluent. The filtered effluent line 23 empties via flow control device 24 and tee fitting 25 into dosing chamber 26. The dosing chamber 26 is provided with a well pump 27 that is activated with a commercially available float control device such as electric, mercury controlled float switch 27A (FIGS. 4 and 6) for activating pump 27 when the fluid level reaches maximum water surface WS in dosing chamber 26. Flow control device 24 can be a check valve with a small metered orifice in the center of the check valve wafer. In this manner, the wafer opens when normal flow is in the direction of arrow 36, from vessel 11 to filter 22, through flow control device valve 24 to sump 26.

Pump discharge line 28 communicates with tee fitting 25 and empties the contents of the dosing chamber 26 after the pump 27 has been activated as occurs when the water surface WS reaches its maximum level and sump 26 is full. When the pump 27 is activated, flow proceeds in the direction illustrated by arrows 37 in FIG. 2.

Discharging flow exits outlet 30 proceeds through discharge header 31 containing the majority of flow volume discharged by pump 27. However, a smaller amount of flow discharged by pump 27 enters line 23 as defined by flow control device 24. The flow control device 24 provides a selected orifice opening that defines how much flow passes the flow control device 24 in a backwash situation. By selectively sizing the flow control orifice fitting of flow control device 24, an exact selected amount of backwashing fluid flow can be transmitted by the pump 27 through the tee fitting 25 and into the line 23 as shown by the arrows 37. Thus, a continuous desired flow of backwashing fluid can be transmitted through the line 23 for backwashing the sand filter 27 in the direction of 37.

Dirty backwash flows into the effluent line 21 during the entire time period that the pump 27 is emptying the dosing chamber 26 via the tee fitting 25 and the flowlines 31 and 23.

In FIGS. 1 and 2, first check valve 20 is positioned between effluent line 21 and effluent header 19. The first check valve 20 allows flow in the direction of arrows 36 in FIG. 1, but disallows flow in the direction of arrows 37 in FIG. 2. Flow backwashing sand filter 22 bypasses first check valve 20 and reenters the upstream interior portion 11A of the aerating vessel 11 via bypass line 38, tee fitting 39, and elbow 42 until it discharges at discharge opening 40.

In the discharge and backwashing configuration of FIG. 2, arrows 41 indicate the direction of drip effluent. A plurality of drip lines 32-35 can be provided, each extending from the header 31. The drip lines 32-35 can be a sprinkler system for irrigation of a lawn, or garden or crops for example.

In FIG. 4, the apparatus of the present invention with aerating treatment vessel 11 is shown with optional adjustable flow control arrangement 56. In FIG. 4, the flow during backwashing proceeds from dosing chamber 26 via flowline 23 in the direction of arrow 37 (FIG. 2). A pair of tee fittings 46, 47 are placed in line 23 as shown in FIG. 4. Second check valve 48 is positioned between tee fittings 46, 47. Each of the tee fittings 46, 47 communicates with a riser section 49, 50 respectively.

Horizontal flowline portion 51 extends between risers 49, 50 and contains control valve 45. In FIG. 4, the adjustable control valve 45 can be opened or closed at ground level 53. Adjustable control valve 45 provides a flow opening that defines the amount of backwash fluid flowing through line 23 in order to backwash the filter 22. In a backwash situation, the backwashing fluid from pump 27 and tee 25 closes second check valve 48. Backwashing fluid first enters tee fitting 47, then riser 50, and then horizontal section 51 with control valve 45. After exiting adjustable control valve 45, backwashing fluid enters riser 49 and then tee fitting 46 before reentering line 23 upstream of second check valve 48. This backwashing fluid then enters the outlet 22B fitting of filter 22 for backwashing as described with respect to the preferred embodiment.

Third check valve 55 prevents backwashing fluid from entering the discharge side of aerating treatment vessel 11. The backwashing fluid travels via bypass line 38 to upstream fitting 52 and is reintroduced via influent flowline 12 to aerating treatment vessel 11. The use of a pair of risers 49, 50 in combination with the second check valve 48 and adjustable control valve 45 allows the backwash flow level to be adjusted as needed at ground level 53. This is important because it allows a very high volume of backwashing fluid to be used from time to time in order to remove any clogging that might have accumulated in the filter. However, the flow value for backwashing fluid passing through adjustable control valve 45 is typically set, as described above at twenty-five percent (25%) of total flow, and where, for example, total flow discharge via header 31 to dripper lines 32-35 would thus be seventy-five percent (75%) of total flow.

FIG. 5 shows the preferred embodiment illustrated in FIGS. 1 and 2 except that FIG. 5 shows the present invention with an alternate non-aerating treatment vessel 54 in place of the aerating treatment vessel 11, and FIG. 5 shows alternate bypass line 57 in place of bypass line 38 as shown in FIG. 1. Bypass line 38 or 57 may discharge backwash water anywhere upstream of the first check valve. All other features of the preferred embodiment as illustrated in FIG. 5 down stream of effluent line 21 are the same of those described for FIGS. 1 and 2.

Figure 6:
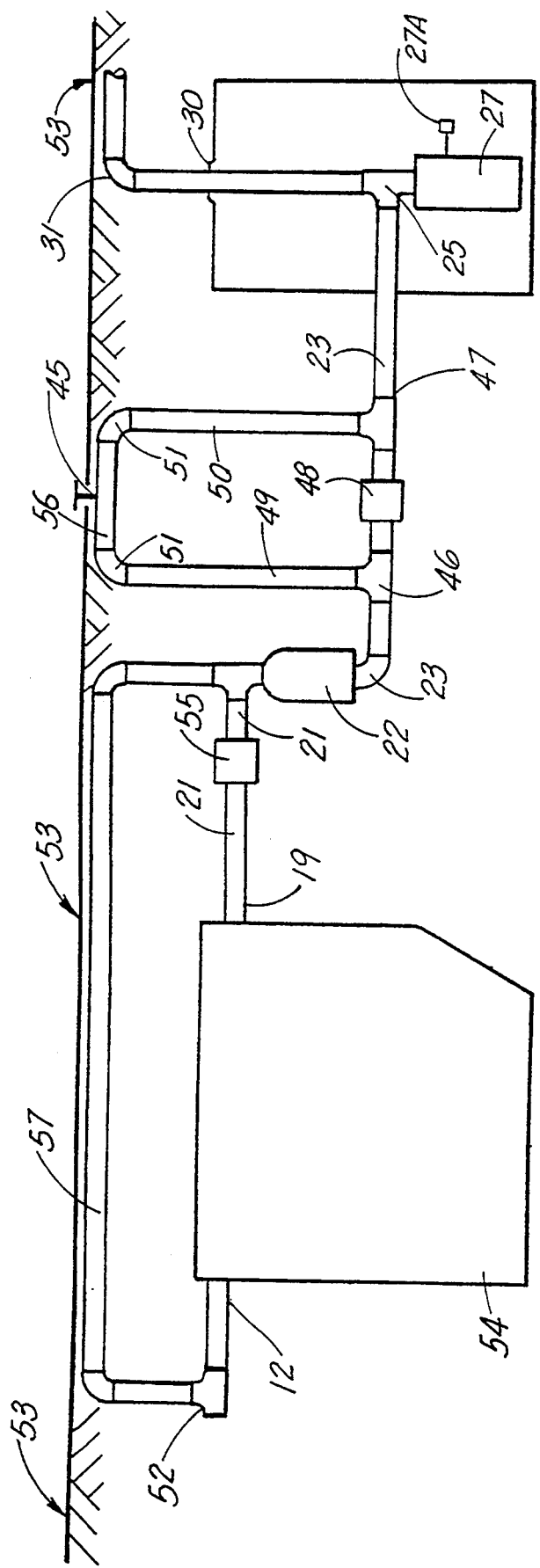
FIG. 6 is a sectional, elevation, and schematic view of the preferred embodiment of the apparatus of the present invention illustrating an alternate non-aerating treatment vessel with an alternate backwash flow volume control valve arrangement.
Figure 7A:
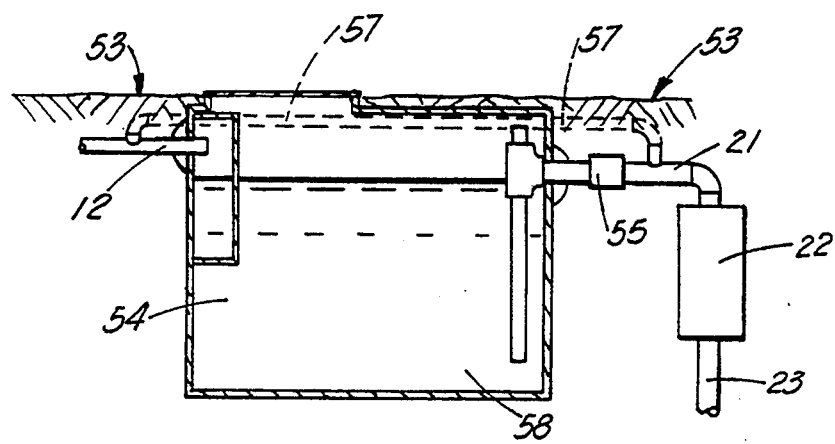
FIGS. 7A-7E are sectional, elevation, schematic, and fragmentary views of alternate non-aerating treatment vessels.
Figure 7B:
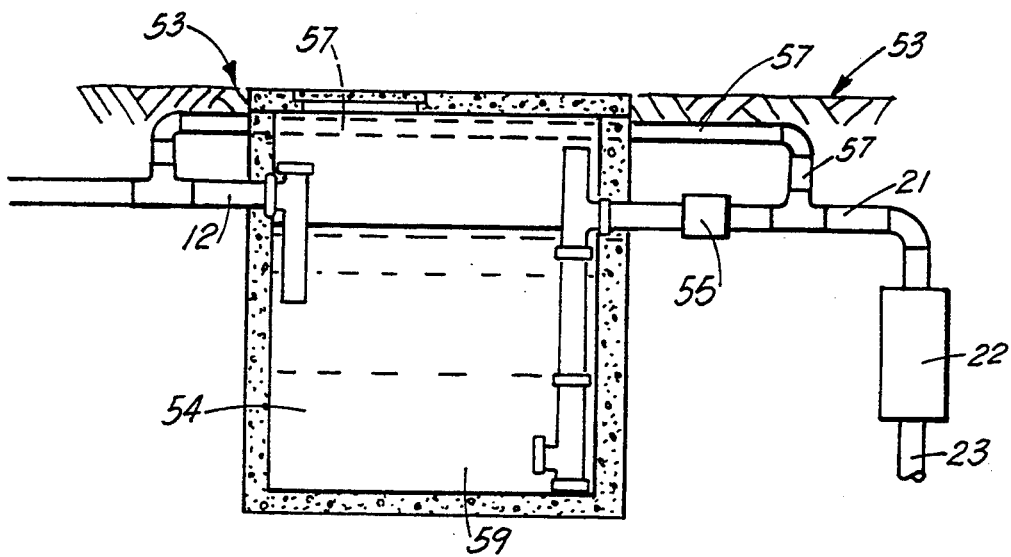
Figure 7C:
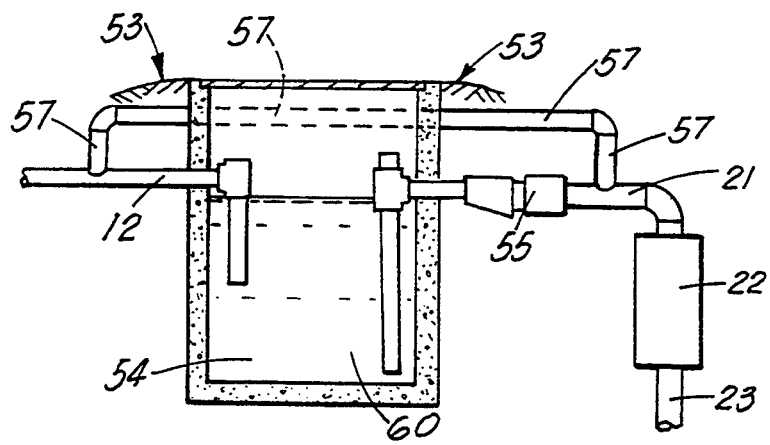
Figure 7D:
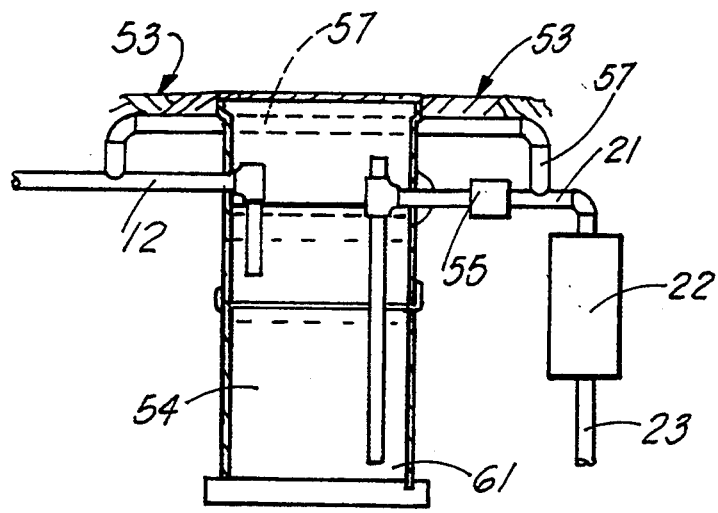
Figure 7E:
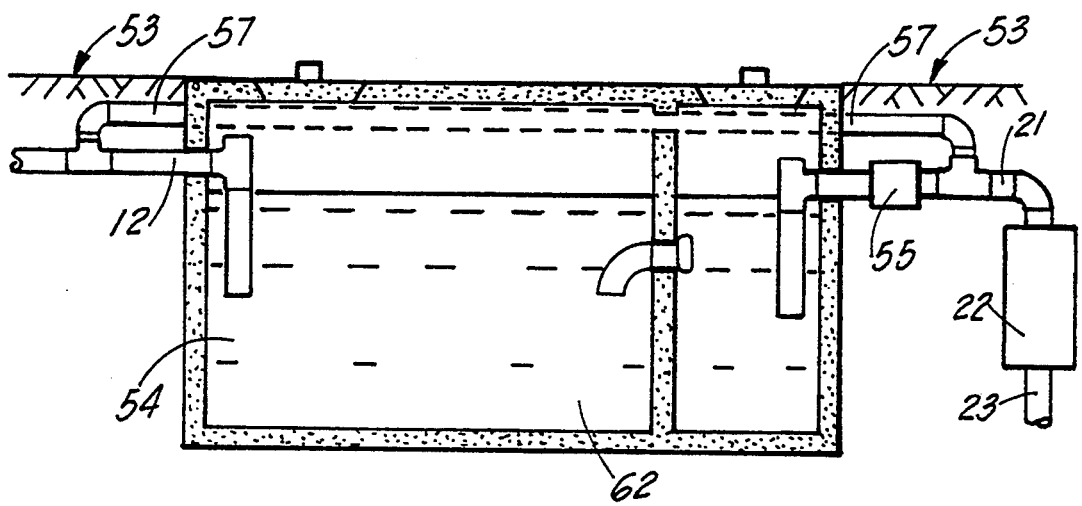

In FIG. 5 influent flowline 12 carries wastewater to be treated into alternate non-aerating treatment vessel 54. Effluent line 21 carries treated wastewater to filter 22 for treatment as previously described. Third check valve 55 located within the effluent line 21 prevents backwashing fluid from entering the discharge line of the alternate non-aerating treatment vessel 54. The backwashing fluid from filter 22 travels via alternate bypass line 57 into the upstream portion influent line 12 through which the filtered backwash is reintroduced to alternate non-aerating vessel 54 to be retreated. FIG. 6 shows the preferred embodiment illustrated in FIG. 4 except that, as in FIG. 5, an alternate non-aerating treatment vessel 54 is illustrated in place of aerating treatment vessel 11 and alternate bypass line 57 is shown in place of bypass line 38. All other features of the preferred embodiment as illustrated in FIG. 4, including the optional adjustable flow arrangement 56 are the same as those described for FIG. 4. The alternate bypass line 57 and the alternate non-aerating treatment vessel 54 illustrated in FIG. 6 are as described previously for FIG. 5.

FIGS. 7A-E show a plurality of alternate configurations of non-aerating treatment vessels 58-62. FIGS. 7A-E relate to FIGS. 5 and 6, where alternate non-aerating treatment vessel 54 is replaced with, alternate configurations of non-aerating treatment vessels 58-62.

Figure 8A:
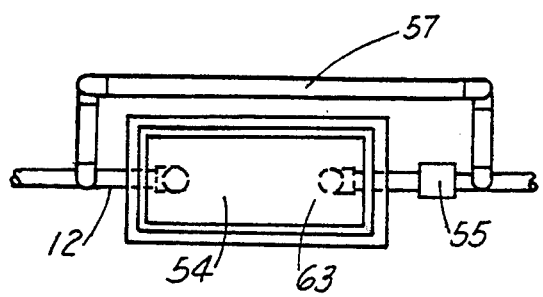
FIGS. 8A-8C are schematic and fragmentary top views of alternate configurations of the alternate non-aerating treatment vessels.
Figure 8B:
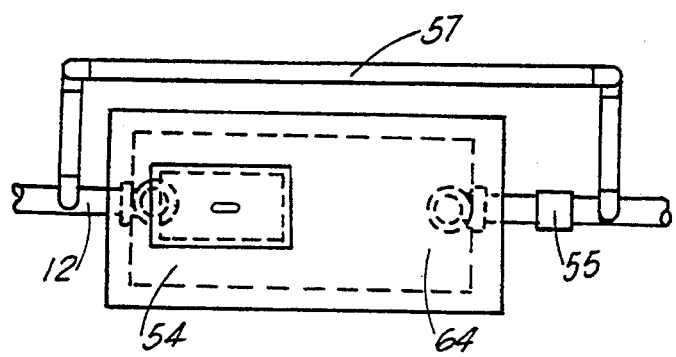
Figure 8C:
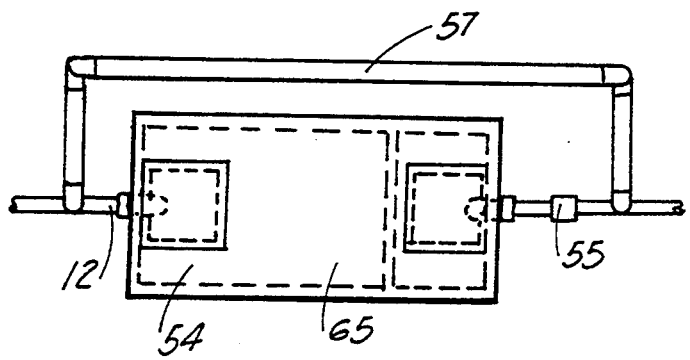
Figure 9A:
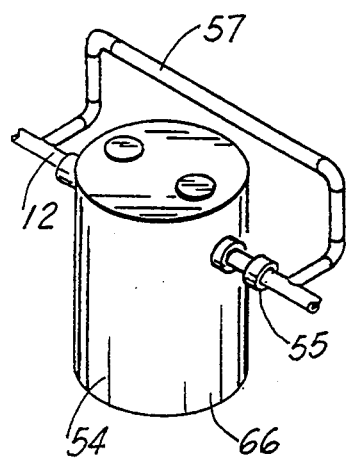
FIGS. 9A-9E are elevation, and fragmentary views of alternate non-aerating treatment vessels.
Figure 9B:
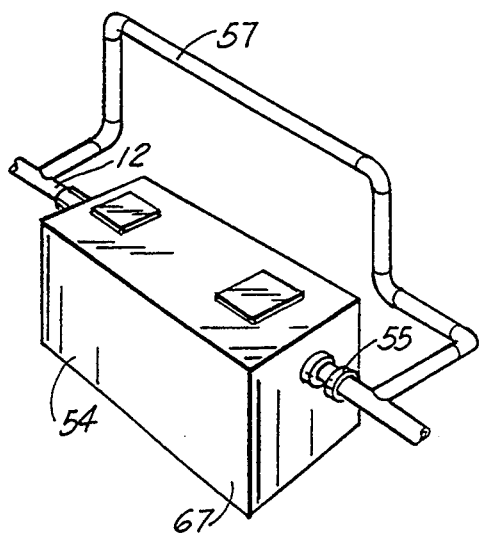
Figure 9C:
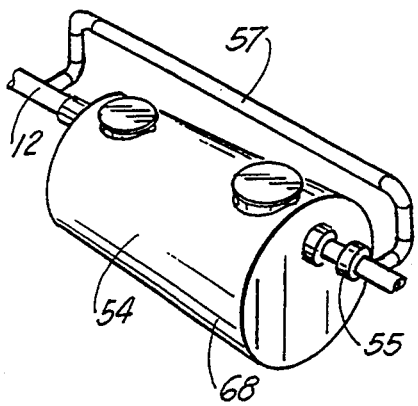
Figure 9D:
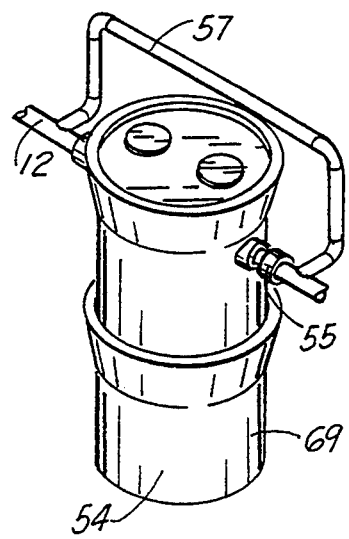
Figure 9E:
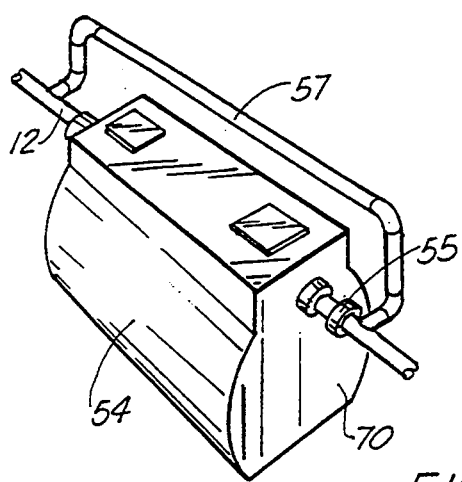

FIGS. 8A-C show a top view if a plurality of alternate configurations of non-aerating treatment vessels 63-65. FIGS. 8A-C relate to FIGS. 5 and 6 where alternate non-aerating treatment vessel 54 is replaced with an alternate configuration of non-aerating treatment vessels 63-65.

FIGS. 9A-E illustrate fragmentary views of the preferred embodiment with alternate configurations of non-aerating treatment vessels 66-70. FIGS. 9A-E relate to FIGS. 5 and 6, where the alternate nonaerating treatment vessel 54 is replaced with a alternative configurations of non-aerating treatment vessels 66-70.

The following table lists the part numbers and part descriptions as used herein and in the drawings attached hereto.

| PARTS LIST | |
| --- | --- |
| Part Number | Description |
| 10 | waste treatment system |
| 11 | aerating treatment vessel |
| 11A | vessel interior (larger) |
| 11B | vessel interior (smaller) |

PARTS LIST -continued

| Part Number | Description |
| --- | --- |
| 11C | aerator |
| 12 | influent flowline |
| 13 | bottom wall |
| 14 | top wall |
| 15 | front wall |
| 16 | rear wall |
| 17 | baffle |
| 18 | inclined wall |
| 19 | effluent header |
| 20 | first check valve |
| 21 | effluent line |
| 22 | filter |
| 22A | filter inlet |
| 22B | filter outlet |
| 23 | filtered effluent line |
| 24 | flow control device |
| 25 | tee fitting |
| 26 | dosing chamber |
| 27 | pump |
| 27A | float switch |
| 28 | pump discharge line |
| 29 | elbow fitting |
| 30 | outlet |
| 31 | header |
| 32 | drip line |
| 33 | drip line |
| 34 | drip line |
| 35 | drip line |
| 36 | flow arrow - filtration |
| 37 | flow arrows - backwashing |
| 38 | bypass line |
| 39 | tee fitting |
| 40 | discharge opening |
| 41 | arrows |
| 42 | elbow |
| 43 | media support plate |
| 44 | filter media |
| 45 | adjustable control valve |
| 46 | tee fitting |
| 47 | tee fitting |
| 48 | second check valve |
| 49 | riser |
| 50 | riser |
| 51 | horizontal section |
| 52 | tee fitting |
| 53 | ground level |
| 54 | alternate non-aerating treatment vessel |
| 55 | third check valve |
| 56 | adjustable flow control arrangement |
| 57 | alternate bypass line |
| 58-70 | alternate configurations of non-aerating treatment vessel |

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A wastewater treatment system comprising:
   a) a treatment vessel having an interior area for containing a wastewater product to be treated;
   b) an influent line arranged for adding wastewater to be treated into the interior of said treatment vessel;
   c) an effluent line arranged for discharging treated wastewater from said treatment vessel;
   d) a filter for filtering treated wastewater effluent from said treatment vessel;
   e) said filter connected to said effluent line in order to receive treated wastewater via said effluent line;
   f) a filter discharge line arranged for transmitting filtered discharge to a collection vessel;
   g) said collection vessel arranged for collecting said filtered discharge;
   h) a pump arranged for emptying said collection vessel when it is filled with the filtered discharge;
   i) a means for controlling a flow of filtered discharge located within the discharge line for enabling a partial volume of liquid to flow in reverse direction through the filter discharge line to backwash the filter upon activation of said pump;
   j) a final discharge line arranged to receive pumped liquid from the collection vessel that does not flow in reverse direction to backwash the filter;
   k) a check valve located in the effluent line;
   l) a bypass line connecting the effluent line downstream of said check valve to the influent line; and
   m) said bypass line arranged to receive filter backwash flow from the backwash of the filter upon activation f said pump, and direct said backwash flow into said treatment vessel via said influent line for subsequent treatment in the treatment vessel.

2. The apparatus of claim 1 further comprising:
   a) a flow control line connected to said filter discharge line on both sides of a check valve;
   b) said flow control line arranged to direct said partial volume around said check valve when said pump is activated; and
   c) a flow control valve located within said flow control line arranged for regulating the amount of pump discharge flowing to backwash the filter upon activation of said pump.

3. The apparatus of claim 1 further comprising:
   a) a drip header system arranged for receiving treated, filtered liquid from said final discharge line upon pump activation; and
   b) said drip header system comprising a network of flow lines for distributing treated, filtered liquid over a selected expansive area.

4. The apparatus of claim 1 wherein said treatment vessel is divided into upstream and downstream portions.

5. The apparatus of claim 1 wherein the pump is a well pump contained within the collection vessel interior.

6. The apparatus of claim 1 wherein it is further provided a level control means for activating the pump when the collection vessel is full of filtered liquid.

7. The apparatus of claim 1 wherein the treatment vessel is a sealed vessel having a top wall that closes the top of the vessel so that the treatment vessel can be installed underground.

8. The apparatus of claim 1 wherein collection vessel is a sealed vessel having a top wall that closes the top of the vessel so that the collection vessel can be installed underground.

9. The apparatus of claim 1 wherein the means for controlling a flow of filtered discharge comprises in part a flow control orifice.

10. The apparatus of claim 1 wherein the means for controlling filtered backwash enables a pre-selected volume of liquid discharged by the pump from the collection vessel to automatically backwash the filter each time the pump is activated to empty the collection vessel.

* * * * *